Oct. 24, 1967    D. W. BIRCH ETAL    3,348,782
AUTOMATIC WINDING MACHINE
Filed June 22, 1965    5 Sheets-Sheet 5
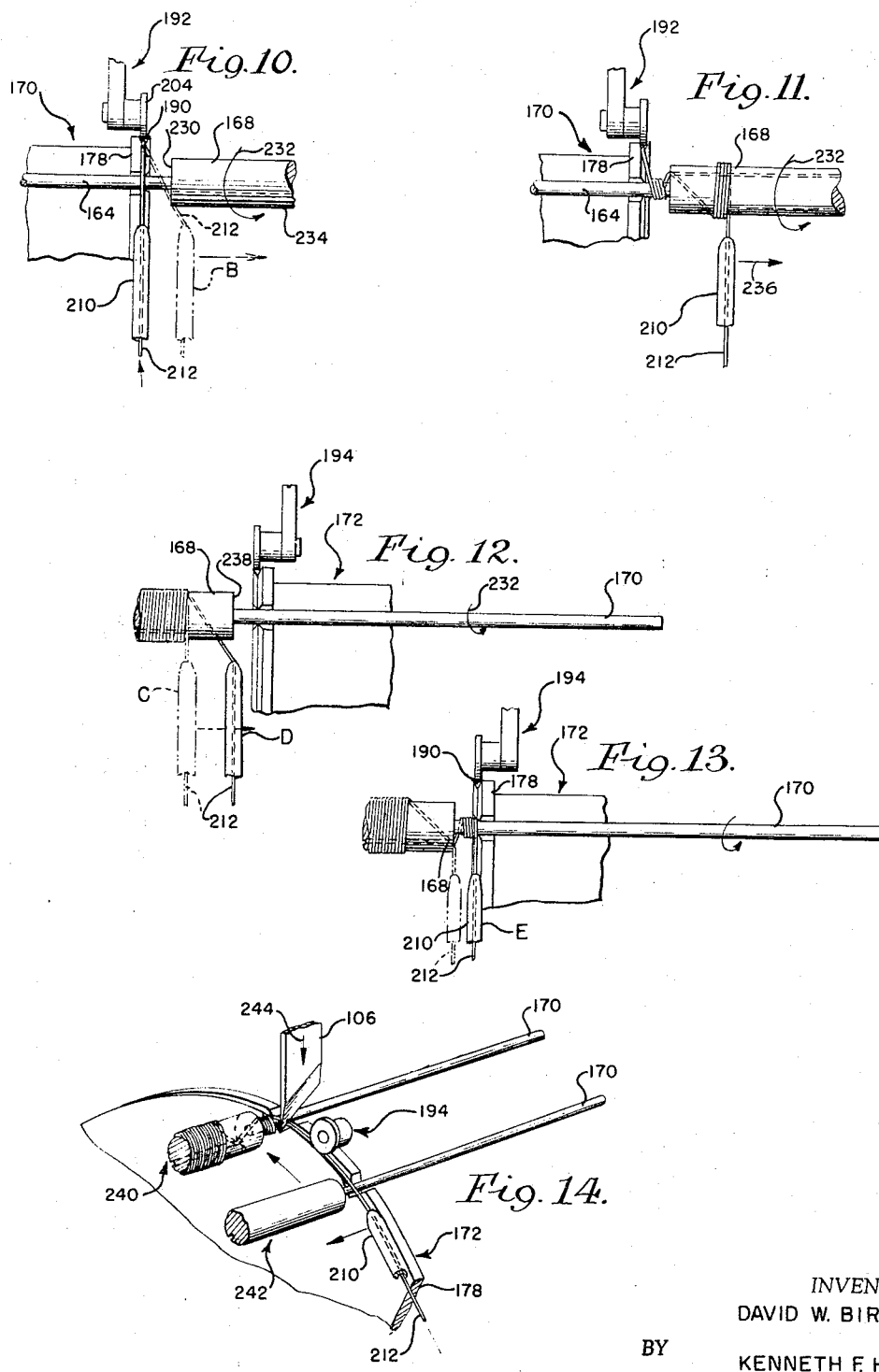
INVENTORS
DAVID W. BIRCH
KENNETH F. HEBDON
BY
Bean, Brooks, Buckley & Bean
ATTORNEYS

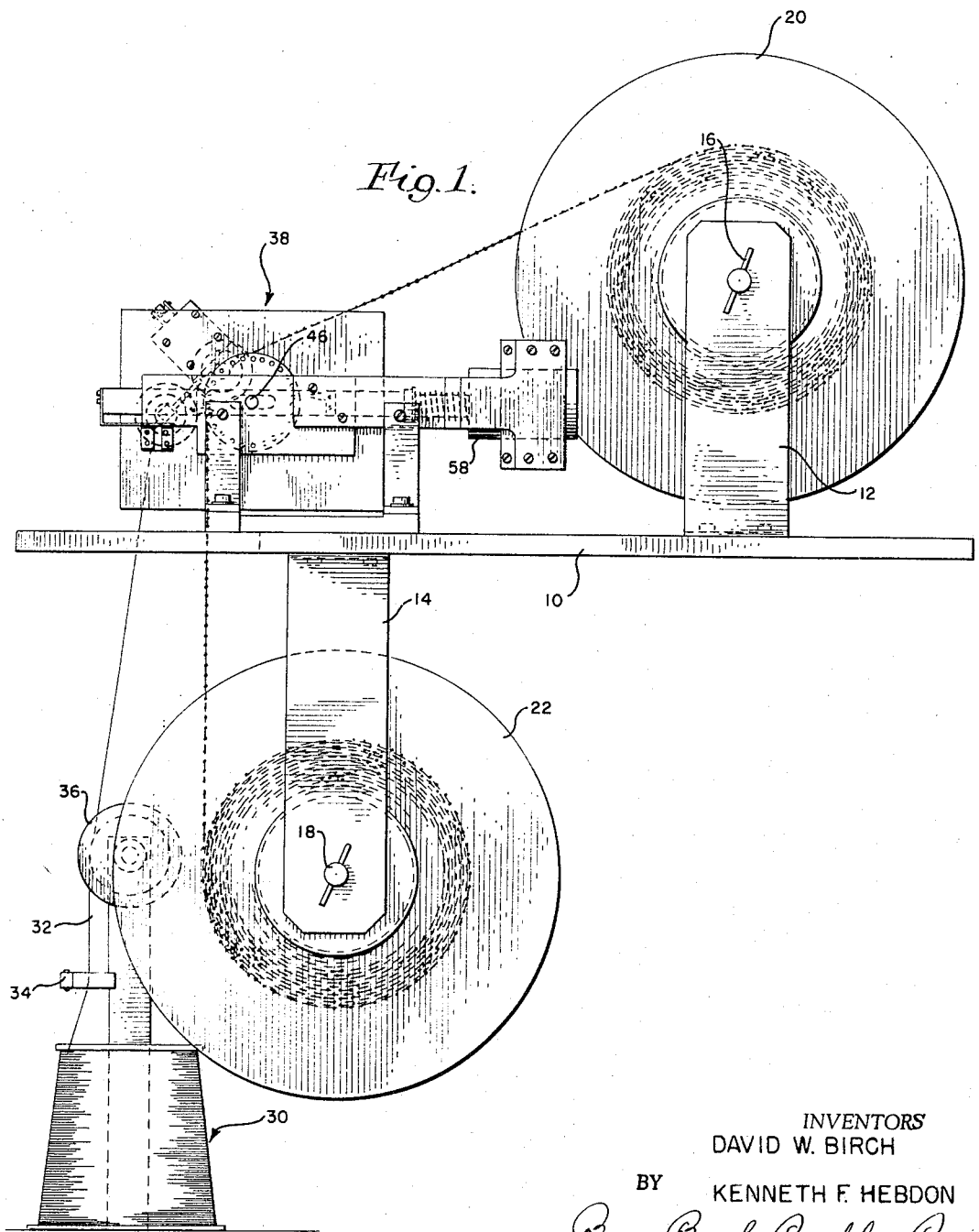

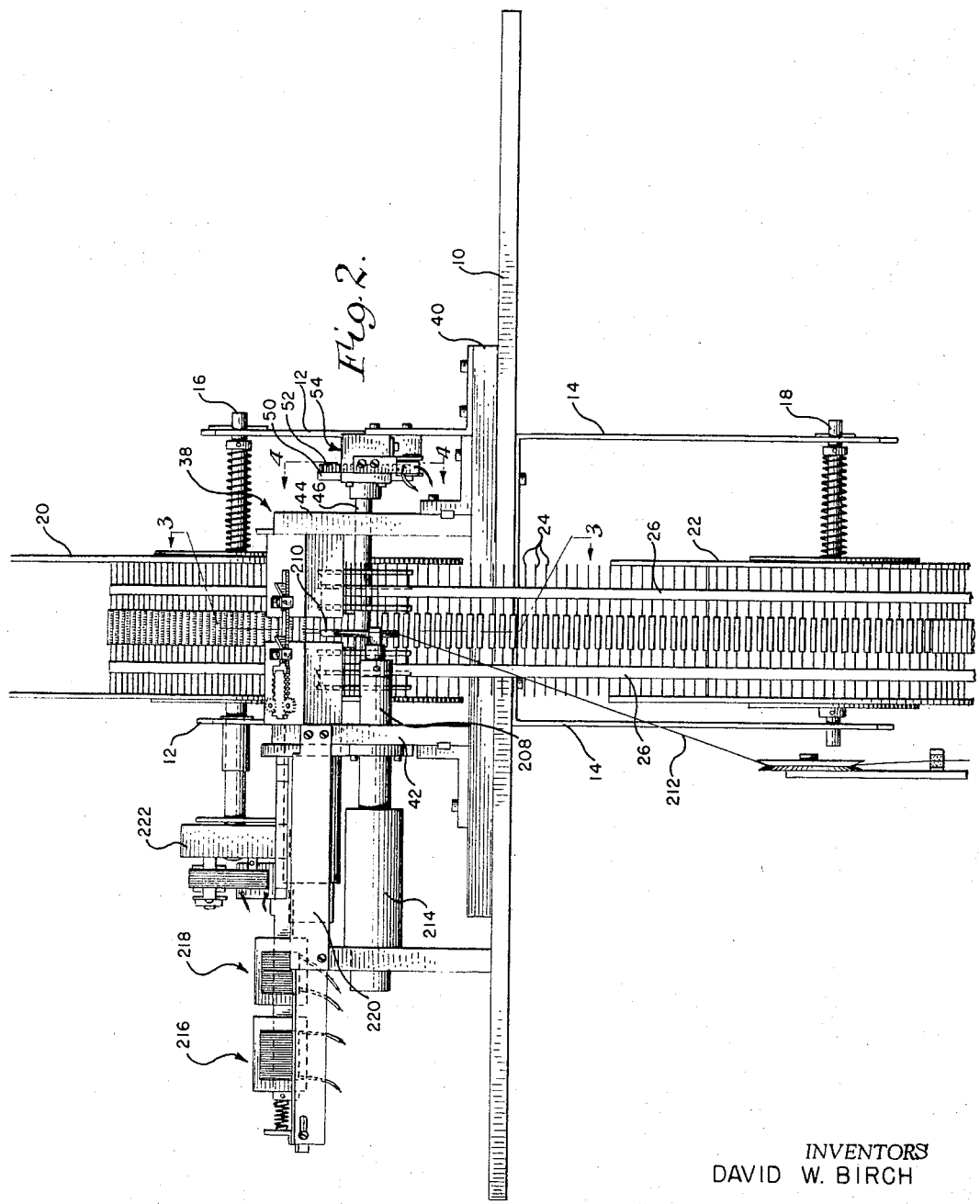

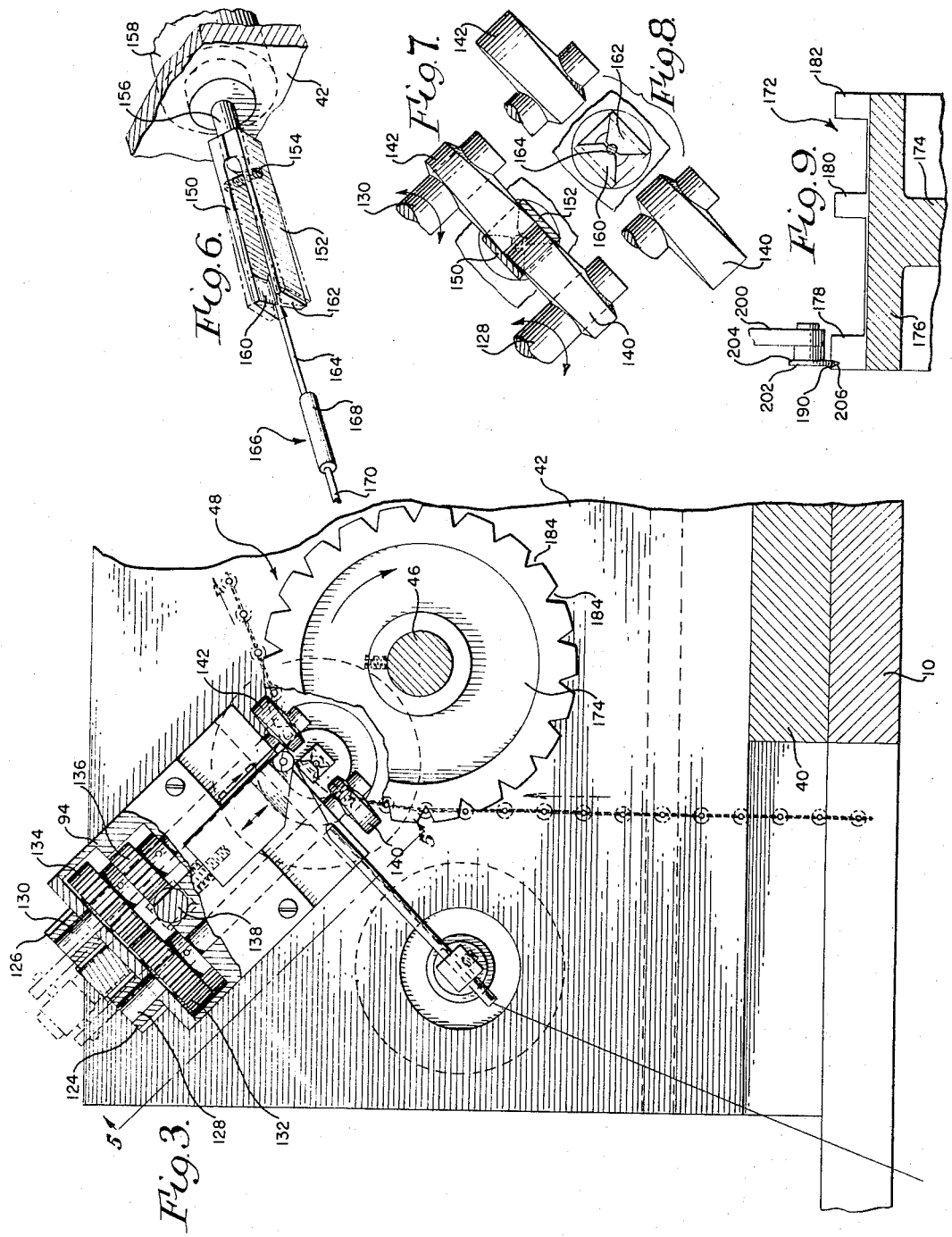

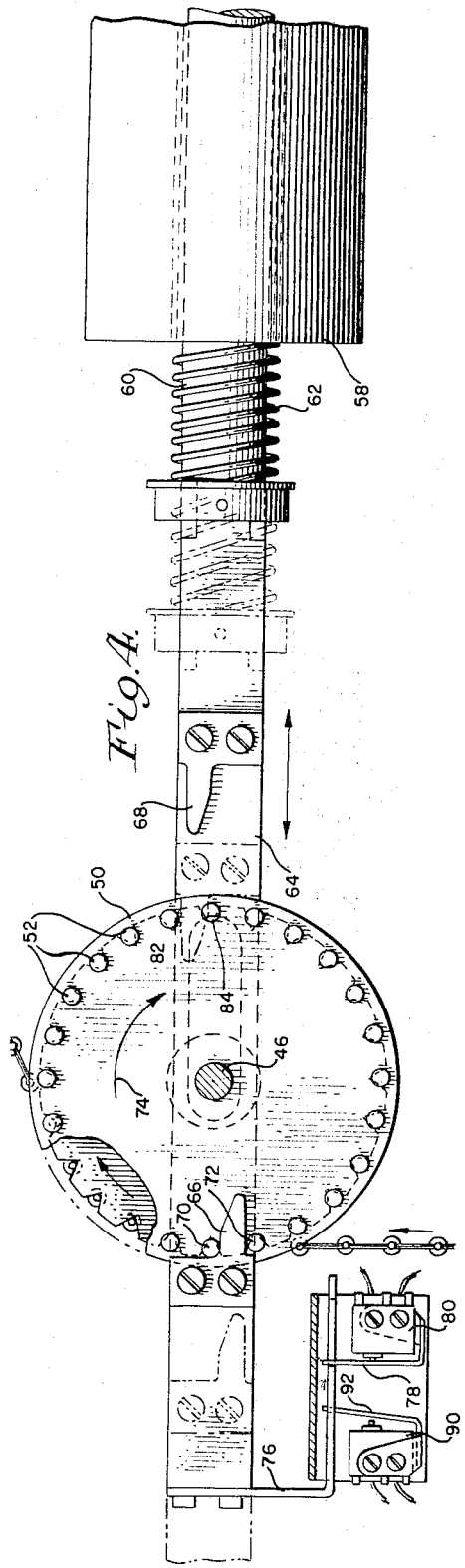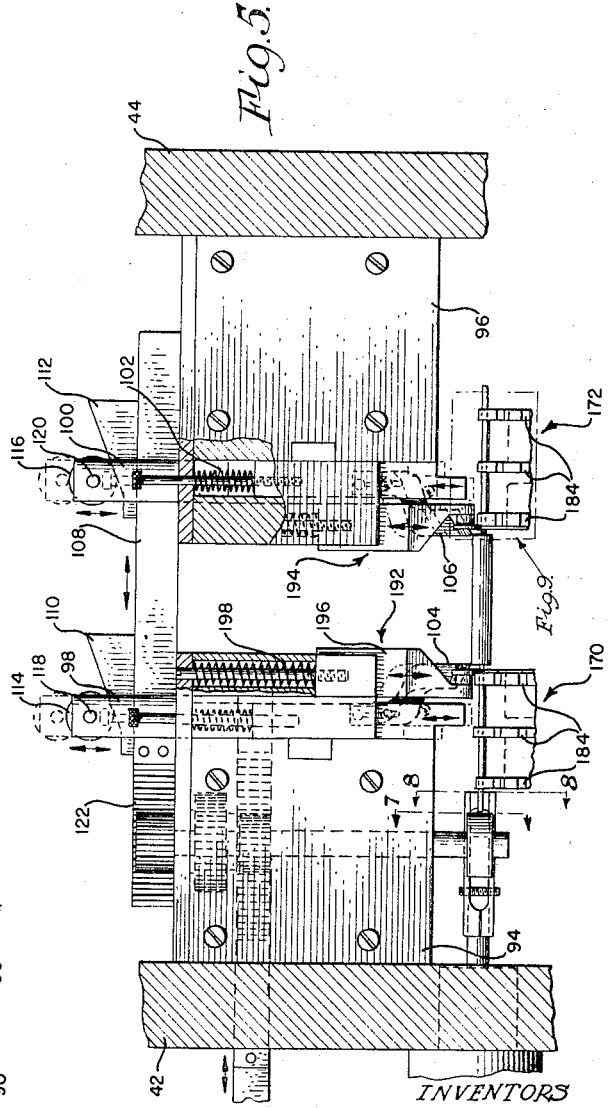

United States Patent Office 3,348,782
Patented Oct. 24, 1967

3,348,782
AUTOMATIC WINDING MACHINE
David W. Birch, Williamsville, and Kenneth F. Hebdon, Arcade, N.Y., assignors to Delevan Electronics Corporation, East Aurora, N.Y.
Filed June 22, 1965, Ser. No. 465,888
2 Claims. (242—9)

ABSTRACT OF THE DISCLOSURE

A winding machine for sequentially winding a series of coil forms supported at their terminal ends by tape elements and thus joined together on a roll. The winding mechanism incorporates a chuck for rotating the coil form connector lead, indexing means for properly orienting the coil forms relative to the chuck and guide mechanism to engage the conductor wire and guide it as it is wound across the coil form.

This invention relates to coil winding machines and pertains in particular to mechanism for automatically effecting the sequential winding of a series of coil forms.

In the electronic component art, the construction of small inductance devices can present a serious problem incidental to the formation or winding of the conductor upon a suitable coil form. The present invention is directed to such an arrangement wherein all the winding steps are automatically performed, it being a particular feature of this invention that the ends of the coil wire are automatically wound upon the connector devices associated with the coil form incidental to the winding operation.

Essentially, the present invention has to do with the sequential winding of coil form elements wherein the mechanism employs anchor devices for frictionally holding the end of the coil wire being wound at the initiation of the winding procedure, and the utilization of a coil form body having notches or other similar coil wire pick-up devices thereon so that the initiation of the winding on the coil form body, the anchoring means will also cause the coil wire to wrap around one of the connector leads associated with the coil form body. Operating in conjunction with this arrangement, the mechanism also employs a second anchoring means brought into play by the indexing movement of a finished coil still having the coil wire attached thereto and which indexing movement of the finished coil causes the coil wire to be engaged by the second anchoring means so that, after the wire is cut, the mechanism is set up for the subsequent winding of another coil form.

Stated another way, the mechanism in accordance with the present invention operates to continuously hold or anchor a free end of the coil wire so that the initial winding procedure effects simultaneosuly a wrapping-off of the free end of the wire around one of the connector leads of the coil form while the initial coil winding is being effected on the coil form body. The tie-off or subsequent wrapping-on effect is achieved independently of the frictional clamping or anchoring means and a subsequent indexing of the finished coil form effects the continuation of the continuous anchoring or clamping of the free end of the coil wire as aforesaid. In this fashion, coils may be very rapidly and efficiently formed in an entirely automatic fashion so that even very small electronic components may be accurately and properly wound in a most efficacious fashion.

Other objects and advantages of this invention will appear from the specification hereinafter and the accompanying drawings, wherein:

FIG. 1 is a side elevational view of a machine constructed in accordance with the present invention;

FIG. 2 is a front elevational view of the machine shown in FIG. 1;

FIG. 3 is an enlarged vertical section taken substantially along the plane of section line 3—3 in FIG. 2 and illustrating the indexing head, the coil wire guide mechanism as well as the drive chuck and associated cam mechanism for opening the chuck;

FIG. 4 is an enlarged vertical section taken substantially along the plane of section line 4—4 in FIG. 2 and showing details of the mechanism for imparting indexing motion to the indexing head;

FIG. 5 is a section taken substantially along the plane of section line 5—5 in FIG. 3 illustrating the anchoring mechanism and the coil wire cut-off mechanism as well as the relative disposition between the chuck and the indexing head;

FIG. 6 is an enlarged perspective view of the chuck assembly illustrating the same in operative engagement with one of the connector leads of a coil form;

FIGS. 7 and 8 are end views of the assembly shown in FIG. 6 illustrating the operation of the chuck actuating cam, these figures being taken along section planes as indicated by section lines 7—7 and 8—8 in FIG. 5;

FIG. 9 is a view as indicated in FIG. 5 illustrating the disposition of the anchoring means with relation to the indexing head;

FIG. 10 is a view illustrating the disposition of component parts at the initiation of a winding cycle, the guide being shown in full lines at the initiation of the cycle and in dot-dash lines at the beginning of the rotation of the coil form;

FIG. 11 is a view similar to FIG. 10 but illustrating the initial winding operation and showing the manner in which the connector lead and the coil form body are simultaneously wound as effected by the cooperation between the anchoring means, and pick-up on the coil form body and the guide means;

FIG. 12 is a view similar to FIGS. 10 and 11 but showing the opposite end of the coil form and showing the guide means in dash-dot lines at the end of the winding operation when the rotation of the coil form is interrupted and showing the guide means in full lines in position for further rotation of the coil form to effect the wrap-off of the coil wire;

FIG. 13 is a view similar to FIG. 12 but showing the disposition of the guide means at the end of the wrap-off operation; and FIG. 14 is a perspective view illustrating the second anchoring means and the manner in which the coil wire is engaged therewith after the finished coil form has been indexed to a new position and an unfinished coil form brought up to the operative station or position of the machine.

With reference now more particularly to FIG. 1, the coil winding machine as shown therein includes a suitable support or base 10 having cradle assemblies 12 and 14 provided with removable spindles 16 and 18 for rotatably supporting spool assemblies 20 and 22. The spool 20 is a take-up assembly and the spool 22 is a feed assembly adapted to transport between these two spools a strip of coil forms which can be seen more clearly in FIG. 2, as illustrated in the lateral figure, a series of coil forms 24 are held in strip or ribbon form so as to be in parallel or generally parallel relationship with each other and substantially equidistantly spaced, this effect being achieved by the strips 26 which are any suitable material capable of holding the coil form as aforesaid and preferably consisting of a pair of back-to-back adhesive strips sandwiching the connector leads of the coil forms therebetween to form a belt of the coil form disposed substantially as is shown and which may be fed from the drum or spool 22 to the spool 20. In regard to the feed and take-up mechanisms, they may be suitably driven by mechanism not shown or may be simply supported for free rotation in which case the index head assembly hereinafter described will pay the belt of coil forms from the supply spool 22 and the take-up spool 20 may be simply hand rotated from time-to-time. In any case, the specific details of these two assemblies form no part of the present invention, suffice it to say that some convenient means forming a supply belt of the coil forms is provided and that some other convenient mechanism or means is provided for receiving the finished coils in the belt form.

Also shown in FIG. 1 is a supply 30 of coil wire 32, which wire issues from the supply 30 and passes through a suitable tensioning device 34 and then over a pulley or guide 36 to be ultimately threaded through a guide means hereinafter more particularly described and forming a part of the winding machine proper indicated generally by the reference character 38 in FIG. 1.

As may be seen more clearly in FIGS. 2 and 5, the winding machine 38 includes a base 40 and a pair of uprights 42 and 44 between which is journalled a shaft 46 (see also FIG. 3) to which an indexing head indicated generally by the reference character 48 is affixed. The shaft 46 extends through the upright 44 and secured to the shaft outboard of the upright 44 is a plate 50 having a series of circumferentially and equidistantly spaced pegs 52 affixed thereon by means of which the indexing head is imparted of step-by-step uniform motion under operation of the indexing actuator indicated generally by the reference character 54.

The indexing actuating mechanism may be seen more clearly in FIG. 4. The actuator includes a solenoid 58 having a movable plunger 60 normally urged under the action of the spring 62 to a left-hand position in FIG. 4 to urge the strap member 64, to which the plunger 60 is attached, to the left in this figure. The strap 64 carries a pair of cams 66 and 68 which are alternately engageable with the pins 52 on the plate 50 substantially as is shown. In the full line position of the assembly as is shown in FIG. 4, the left-hand cam 66 has been engaged between the two pins 70 and 72 to impart rotation of the plate 50 in the direction of the arrows 74, the solenoid 58 at this time being energized to urge its plunger 60 to the right to thus press the springs 62. The strap 64 carries a switch actuating arm 76 which, in the right-hand position of actuation, as is shown, operates the actuating finger 78 of the switch 80 to break the circuit to the solenoid 58 and thus permit the strap 64 to return to its left-most position shown in dotted lines in FIG. 4. During the return motion, the cam 68 engages between the pins 82 and 84 to complete the motion of the plate 50 in the direction of the arrows 74. The two cams 66 and 68 are spaced apart such a distance that one or the other of them is always engaged with the pins 52 to prevent the plate 50 and consequently the indexing head 48 from being free to rotate at any time during the operation of the machine. Thus, a positive indexing action is achieved without danger of misalignment of the indexing head. When the strap 64 is returned to its normal left-hand position, the switch 90 is actuated through its actuating finger 92 to prepare the associated circuitry not shown for the subsequent winding operation thereof.

As is shown more clearly in FIG. 5, the respective uprights 42 and 44 mount support block assemblies 94 and 96 which, in turn, mount the respective cutter actuating plungers 98 and 100. These plungers 98 and 100 are slidably mounted in the blocks 94 and 96 respectively and are normally spring-urged as, for example, by the springs 102 to lowermost cutting positions. The plungers 98 and 100 carry the cutter blades 104 and 106 respectively which, when urged under the action of the springs 102, effect a cutting action hereinafter more particularly described. The upper ends of the respective plungers 98 and 100 are bifurcated to straddle a rack bar 108 which carries the ramp cams 110 and 112 adapted to cooperate and engage the cam rollers 114 and 116 mounted on suitable spindles 118 and 120 at the upper ends of their respective plungers 98 and 100 substantially as is shown. In FIG. 5, movement of the rack bar 108 to the left will effect cammed operation of the plungers to their upper dotted line positions whereat the cutters 104 and 106 are inoperative. When the rack bar 108 is moved to the right in FIG. 5 as shown in full lines therein, the cutters 104 and 106 are urged under the action of the springs 102 to their lower cutting positions hereinafter more particularly described.

The rack bar 108 is provided with a toothed rack portion 122 straddled by and engaged with a pair of pinions 124 and 126, see FIGS. 3 and 5. The pinions 124 and 126 are in turn affixed to the shafts 128 and 130 coupled together by the pinion members 132 and 134 housed within the block 94. The shaft 130 carries a further fixed pinion member 136 engaged with a solenoid operated rack plunger 138 by means of which rotary motion is imparted to the shaft 130, and through the coupling gears 132 and 134 to the shaft 128 in an opposite sense. The two shafts 128 and 130 project completely through the block 94 and carry, at their lower ends, the chuck actuating cams 140 and 142. The operation of the chuck cams is shown more clearly in FIGS. 7 and 8 whereas the chuck itself is shown in FIG. 6. The chuck may be formed simply from a pair of resilient finger members 150 and 152 urged together by a suitable screw device 154 to clamp upon the motor shaft 156 which is rotated in a manner hereinafter more particularly described under the action of the motor 158 mounted on one side of the upright 42 as shown. The fingers 150 and 152 are provided, at their free end portions, with jaw portions 160 and 162 by means of which they clamp upon the connector lead 164 of a coil form indicated generally by the reference character 166, which connector lead 164 is connected to the main body portion 168 of the coil form, a further connector lead 170 being connected independently to the opposite end of the body 168. The cams 140 and 142 are of wedge shape so that when rotated, they wedge themselves between the spaced finger portions 150 and 152 and urge them apart to thus separate the jaws 160 and 162 to clear the associated connector lead 164. The motor 158 is so constructed as to be accurately indexed whenever stopped so that an open side of the chuck is disposed to clear the connector lead 164 and permit the same to be disposed between the jaw portions 160 and 162.

The indexing head assembly 48 is shown more clearly in FIGS. 3, 5 and 9 and will be seen to consist of a pair of synchronized wheels or discs indicated generally by the reference characters 170 and 172 each of which is of a generally cylindrical form and, as is shown in FIG. 9, includes a web 174 and a circumferential flange 176, the latter of which is relatively wide and is provided with a plurality of radial flanges 178, 180 and 182 each of which is provided with a V-shaped notch 184 for cradling the connector leads 164 and 170 therein. The various notches 184 are transversely aligned substantially as is shown in FIG. 5 and it will be appreciated that the indexing mechanism shown in FIG. 4 is arranged to advance the indexing head 48 one notch at a time. The operative station or position of each coil form for winding purposes is in alignment with the chuck assembly shown in FIG. 6 and it will be appreciated that the operation of the indexing mechanism in FIG. 4 is timed with the operation of the cam mechanism shown in FIGS. 7 and 8 so that the chuck releases the connector lead 164 during indexing operations and is then reengaged with the next connector lead 164 of the newly positioned coil form at the termination of the indexing operation. The two indexing head wheels or discs are relatively movable on the shaft 46 so as to permit these two wheels to be spaced more or less apart so as to accommodate the coil form bodies 168 therebetween. In this respect, the adjustment is made such as to provide only a very slight amount of end clearance between the coil form body 168 and each of the wheels 170 and 172, the purpose of this being presently apparent.

The inner radial flange 178 of which each of the wheels 170 and 172 is provided with a circumferential groove or notch as indicated by the reference character 190 in FIG. 9 and cooperating with each of these grooves in an anchor member such as the anchor members indicated by reference characters 192 and 194, see particularly FIG. 5. Each anchor member includes a body portion 196 slidably received in an associated block 94 or 96 and acting against a compression spring 198 so that these anchor members are normally pressed into engagement with the associated wheel 170 or 172 substantially as is shown in FIG. 9. The lower end 200 of each anchor member, as will be seen in FIG. 9, carries a roller 202 provided with a narrow flange 204 riding in the notch 190 and operative to frictionally anchor or engage the coil form wire as indicated by the reference character 206 in FIG. 9. The purposes of this construction will be apparent hereinafter.

To complete the assemblage, a non-rotatable but axially slidable spindle 208 (see FIG. 2) projects through the upright 42 and carries in its free end portion a guide needle member 210 through which the coil form wire 212 is threaded for ultimate disposition under one or the other of the anchor members 192 or 194, as hereinafter specified. A motor 214 is utilized to drive the guide member 210 so that the same traverses between the two wheels 170 and 172 as hereinafter more particularly described. Behind and slightly above the motor 214 are a pair of solenoids 216 and 218 mounted on suitable support mechanism 220 for actuating the plunger rack 138 previously described which effects rotation of the shafts 128 and 130 for the purposes set forth. On this same general support mechanism 220, a suitable take-up drive motor 222 may be mounted for effecting periodic take-up drive to the spool 20 as previously mentioned.

The manner in which the coils are sequentially wound is illustrated in FIGS. 10-14 inclusive. Referring first to FIG. 10, the mechanism as shown therein illustrates the needle 210, in full lines, in position at the initiation of a cycle, it being noted that when in this position, the guide or needle 210 is aligned with the groove 190 in the inner flange 178 of the associated guide wheel 170. The free end of the coil wire 212 is anchored or frictionally clamped by the roller flange 204 of the anchor assembly 192, and the coil wire 212 issues therefrom into overlying relationship with connector lead 170 of the coil form illustrated and passes through the needle assembly 210. At this point, the coil form is stationary but the connector lead 170 is engaged by the chuck assembly preparatory to effecting rotation of the coil form. At this point in the operation, the guide means motor 214 is energized to move the guide needle 210 from the full line position shown in FIG. 10 to the dash-dot line position as indicated by the reference character B so tha the coil wire as shown in dashed lines engages the end face 230 of the cylindrical body portion 168 of the coil form. Now, when the coil form is rotated as indicated by the arrow 232, the coil wire 212 will be picked up by the longitudinally extending notch or slot 234 in the body 168 of the coil form, as a result, the coil wire 212 will be carried around the body 168 and will not only commence to wrap therearound but will also wrap around the connector lead 164. This action is shown more clearly in FIG. 11 and is due to the presence of the clamping or anchoring assembly 192, as will be readily apparent. After a couple of wraps are made around each the connector lead 164 and the body 168, the coil wire 212 is securely anchored and continued rotation thereof will complete the wrap-on action of the coil wire onto the connector lead 164, even after the coil wire has been pulled out from under the anchor member 192, this of course being due to the fact that the connector lead 164 is being rotated with the coil form and is backed up by the flange 178. While this wrapping action is taking place, the guide member 210 is being fed to the right as indicated by the arrow 236 in FIG. 11.

When the desired number of turns of the coil wire are wrapped about the body 168, rotation of the coil form is stopped as for example when the guide needle 210 is in the position indicated in dashed lines at C in FIG. 12. However, motion of the guide needle 210 is continued until it achieves the position shown in full lines at D in FIG. 12 whereat the tip of the needle is aligned substantially with the end face 238 of the cylindrical body 168. At this point, the coil form is again rotated in the direction of the arrow 232 in FIG. 12 to form a wrap-off action due to the fact that the coil wire will be picked up by the opposite end of the notch or groove 234 previously mentioned and this wrap-off action is continued until the guide needle 210 reaches the position shown at E in FIG. 13. In the position E, the tip of the needle 210 is aligned with the groove 190 in the flange 178 of the other guide wheel assembly 172, substantially as is shown.

At this point, the coil assembly is completely wound and all operations are completed except that the coil wire 212 is still attached to the coil form assembly. At this point, the indexing mechanism is operated to move the now finished coil form to the position as indicated by the reference character 240 in FIG. 14. That is to say, the coil form is advanced one notch or position and in so doing, the coil wire has been moved beneath the other anchoring means 194 so as to be frictionally clamped thereby, substantially as is shown in FIG. 14 thus positioning the next coil form 242 to be wrapped in position but with the needle 210 at the opposite ends of its travel but corresponding in mirror image fashion to the position shown and described in connection with FIG. 10. Prior to the indexing of the finished coil form 240 to the position shown in FIG. 14, the plunger rack 138 was operated to release the chuck assembly shown in FIG. 6 and to raise the knives or cut-off members 104 and 106. When the indexing operation is complete, and the plunger rack 138 is returned to its initial position, the knives 104 and 106 will descend as indicated by the arrow 244 in FIG. 14 to effect the cutting off the coil wire closely adjacent to the connector lead 170 of the coil form assembly 240. Thus, the coil wire is now free to commence operation to wind in the opposite direction (i.e., from right to left) to thus properly wind the coil form assembly 242.

We claim:
1. In combination with a coil form having a cylindrical body provided with notched ends and connector leads extending from such ends,
   means for rotatably supporting said coil form by said connector leads thereof at a fixed station,
   means for selectively rotating said coil form while at said fixed station,
   a length of coil wire,
   means for anchoring one end of said coil wire at a point on one side of said fixed station and at a position adjacent one end of said cylindrical body,
   coil wire guide means mounted for movement traversing the length of said body on the opposite side of said fixed station to first engage the coil wire against said one end of the cylindrical body while the same is rotated and thereby cause said coil wire to simultaneously wrap about said body and the connector lead associated with said one end thereof,
   means for anchoring the coil wire at a point on said one side of fixed station and at a position adjacent the opposite end of said cylindrical body,
   means for indexing said coil form from said fixed station to a position beyond said means for anchoring, and means for cutting the coil wire when said coil form has been indexed as aforesaid.

2. In combination with a strip of parallel similar coil forms, each having a cylindrical body provided with notched ends and connector leads extending from such ends,
- a chuck for selectively engaging a coil form connector lead and means for selectively rotating said chuck,
- an indexing head engaging said strip of coil forms for selectively indexing one of said coil forms with said chuck,
- a length of coil wire,
- means for anchoring one end of said coil wire at a point on one side of a coil form indexed with said chuck and adjacent one end of the coil form body,
- guide means for said coil wire for engaging the free portion of the coil wire against said one end of the body while said body is being rotated and to thereafter feed said coil wire along the length of said body to and off the opposite end thereof,
- a second wire anchoring means being positioned to permit a coil form when indexed from the position thereof with said chuck to pass beyond such anchoring means,
- and means for cutting the coil wire carried by a coil form to the position beyond said anchoring means.

References Cited

UNITED STATES PATENTS

| 2,341,369 | 2/1944 | Fornwald | 242—25 |
| 2,765,124 | 10/1956 | Sickles | 242—9 |

FOREIGN PATENTS

| 682,421 | 3/1964 | Canada. |
| 480,501 | 2/1938 | Great Britain. |

OTHER REFERENCES

German printed publication, 1,091,920, October 1960.

FRANK J. COHEN, *Primary Examiner.*

BILLY S. TAYLOR, *Examiner.*